(12) United States Patent
Fedderly et al.

(10) Patent No.: US 11,269,857 B2
(45) Date of Patent: Mar. 8, 2022

(54) STRUCTURED DATA COLLECTION, PRESENTATION, VALIDATION AND WORKFLOW MANAGEMENT

(71) Applicant: Palantir Technologies Inc., Palo Alto, CA (US)

(72) Inventors: Matthew Fedderly, Baltimore, MD (US); Cooper Bills, Fremont, CA (US); Geoffrey Bakker, Washington, DC (US); Kunal Marwaha, Washington, DC (US); Nathaniel Klein, Washington, DC (US)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 8 days.

(21) Appl. No.: 17/083,289

(22) Filed: Oct. 28, 2020

(65) Prior Publication Data

US 2021/0049149 A1   Feb. 18, 2021

Related U.S. Application Data

(63) Continuation of application No. 15/906,718, filed on Feb. 27, 2018, now Pat. No. 10,853,352.
(Continued)

(51) Int. Cl.
*G06F 16/23* (2019.01)
*G06F 40/174* (2020.01)

(52) U.S. Cl.
CPC ........ *G06F 16/2365* (2019.01); *G06F 40/174* (2020.01)

(58) Field of Classification Search
CPC .............. G06F 16/2365; G06F 40/174; G06F 16/2428; G06Q 10/06316
(Continued)

(56) References Cited

U.S. PATENT DOCUMENTS

2007/0185935 A1* 8/2007 Olivieri .................... G06F 40/18
2011/0016202 A1* 1/2011 Ye ....................... H04L 41/0869
709/222

OTHER PUBLICATIONS

U.S. Appl. No. 15/906,718, filed Feb. 27, 2018.

* cited by examiner

*Primary Examiner* — Michael Pham
(74) *Attorney, Agent, or Firm* — Hickman Becker Bingham Ledesma LLP

(57) ABSTRACT

Software-based technologies for improving structured data collection, presentation, validation, and workflow management processes are disclosed, including the use of interpretable configuration files to define data objects, generate object-level and sub-object-level specifications for a forms-based interface, validation processes and a workflow-based interface. A back-end integration component maps the data objects, validation and workflow processes, and interface specifications to portions of a back-end database system. In one embodiment, a data processing system comprises one or more processors; one or more storage media storing instructions which, when executed by the one or more processors, cause the one or more processors to perform operations comprising causing a first computing device to interpret a configuration file; in response to the first computing device interpreting the configuration file, causing a display device to generate a forms-based interface comprising a data input control element arranged to obtain data in association with a data object that is defined in the configuration file; in response to detecting receipt of a data item by the data input control element of the forms-based interface, executing a data validation process that is, in the configuration file, associated with the data item; in response to validation of the data item by the data validation process, causing, by a second computing device, mapping the data item to a
(Continued)

back-end data object; causing, by the second computing device or a third computing device, altering a validation process associated with the back-end data object based on a result of the executing of the validation process associated with the data item in the configuration file; causing storing the data item in a database system in association with the back-end data object.

20 Claims, 6 Drawing Sheets

Related U.S. Application Data

(60) Provisional application No. 62/609,331, filed on Dec. 21, 2017.

(58) Field of Classification Search
USPC .......................................................... 707/690
See application file for complete search history.

STRUCTURED DATA COLLECTION, PRESENTATION, VALIDATION AND WORKFLOW MANAGEMENT

CROSS-REFERENCE TO RELATED APPLICATIONS; BENEFIT CLAIM

This application is a continuation of U.S. application Ser. No. 15/906,718, filed Feb. 27, 2018 which claims the benefit of U.S. Provisional Patent Application No. 62/609,331, filed Dec. 21, 2017, the entire contents of which is hereby incorporated by reference as if fully set forth herein, under 35 U.S.C. § 119(e). The applicant(s) hereby rescind any disclaimer of claim scope in the parent application(s) or the prosecution history thereof and advise the USPTO that the claims in this application may be broader than any claim in the parent application(s).

COPYRIGHT STATEMENT

A portion of the disclosure of this patent document may contain material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The present disclosure relates to the technical field of software engineering, and more particularly to technologies for developing software for structured data collection, presentation, validation, and workflow management.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In a distributed database system, multiple interrelated databases can be implemented in multiple different physical computers and/or data storage devices that are connected by a network. A database management system includes software that provides an interface by which other software applications can access data stored in the distributed databases.

Individual databases in the distributed system can be heterogeneous in that some of the databases may organize stored data according to different logical structures or models. The manner in which stored data can be accessed and manipulated by software is determined by the model that is used by a particular database. Information retrieval technologies can be used to search and obtain data stored in the databases in a distributed system.

DETAILED DESCRIPTION

Figure 1:
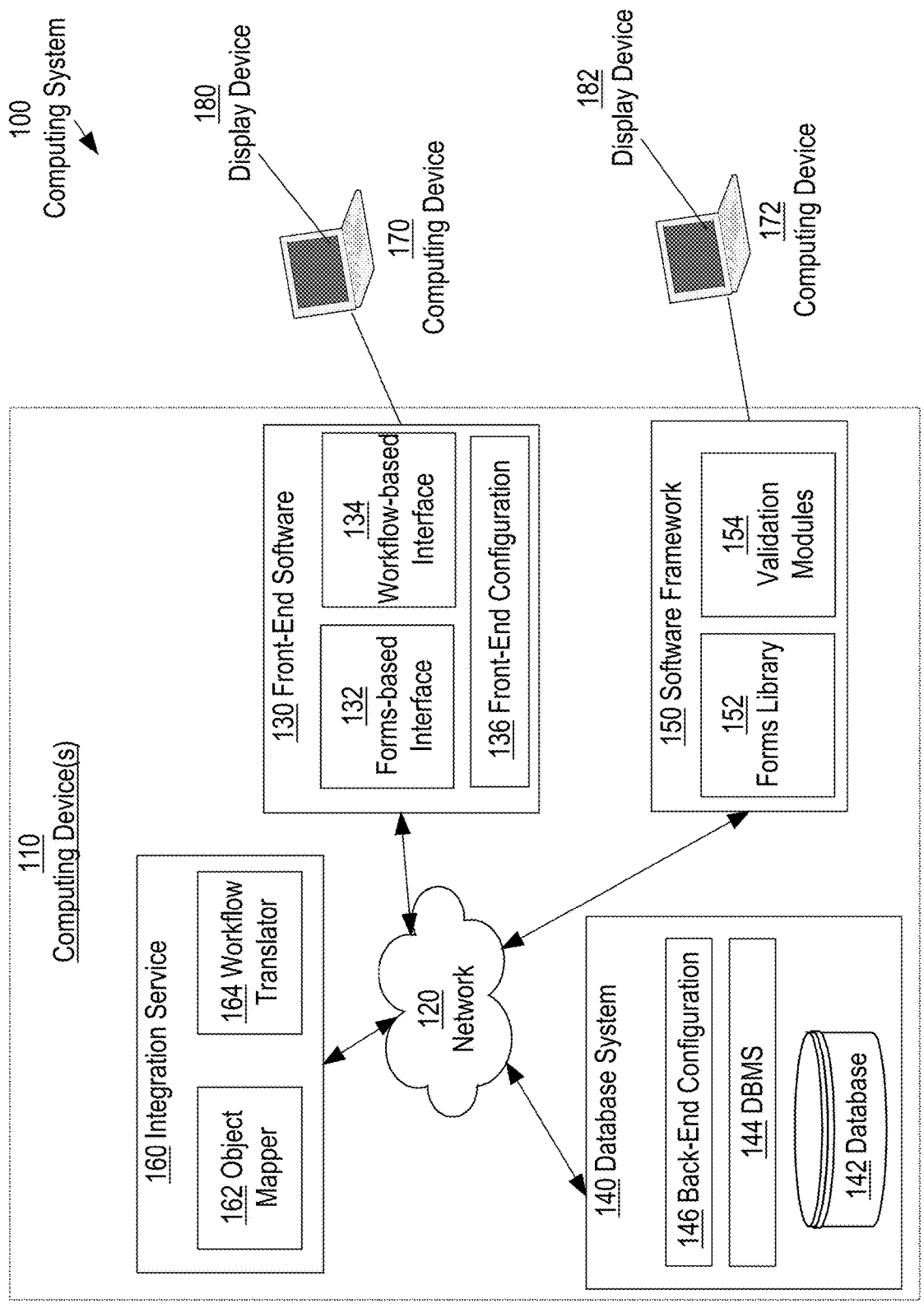
FIG. 1 is a block diagram that depicts an example system that includes software components for structured data collection, presentation, validation, and workflow management.

Recent advances in computer hardware, data processing, and networking technologies have made large quantities of data more accessible to networked computer systems. However, the quality and effectiveness of computer-implemented data analysis processes greatly depends on the quality of the data that is ingested by the computer system.

Structured data collection techniques can be used to ensure that data ingested by the database system conforms to certain guidelines or policies. Forms and workflows can be designed to implement structured data collection, presentation, and validation techniques.

Data collected via forms is stored in a back-end database system. The database system arranges data according to a particular model that defines, for example, object types, object properties, data objects, and relationships between data objects. The model is implemented in software by a database schema.

A form is typically bound to the database schema that is used by the back-end database system. Thus, design of a front-end form for data collection is constrained by the back-end model. A form developed for use with one back-end database system is often not easily portable to another back-end system. When back-end systems are designed according to different models, portions of the front-end software may need to be re-written from scratch to accommodate a different back-end model, or may require extensive modifications, which can be time-consuming and costly.

This disclosure describes technologies that can be used to develop, implement, customize, and operate data collection, presentation, validation, and workflow management systems. A set of software components cooperate to logically decouple the front-end data collection, presentation, validation, and workflow management software from the back-end database system(s) that are being used to store the data that is collected by the front-end software. This logical decoupling facilitates configuration of the front-end software according to the data collection and validation needs of a particular application or domain and enables porting of the front-end software across heterogeneous back-end database systems. Moreover, the disclosed technologies facilitate post-implementation introduction of software modifications, such as customization of data validation processes.

In an embodiment, the approaches described herein are implemented in a set of software components that includes a front-end configuration component and a back-end integration component. The front-end configuration component includes a forms framework, a validation framework, and a workflow management component. "Framework" as used herein may refer to a set of "building block" software programs that can be used and modified to build a particular software application.

The front-end integration component can be implemented using a set of computer-interpretable configuration files created using a markup language such as YAML (.yml files) and Java code. The workflow management component permits parts of configuration files to specify processes for reviewing, manipulating, and verifying data, illustratively using an "inbox" paradigm. These processes can be used to create any number of inboxes and specify document types that are associated with any of the inboxes as well as operational actions that are permitted on documents in an associated inbox and the methods that the actions trigger.

The back-end integration component can map back-end agnostic (or "simple") data objects (and their associated properties and links) used by the forms framework to different or more complex data objects (and their associated properties and links) in a particular back-end model of interest. The back-end integration component can also translate back-end agnostic workflows used by the validation and workflow management components to the appropriate back-end commands and state transitions.

The disclosed technologies are described in detail below, with reference to the drawings. The full scope of the disclosed technologies includes, but is not limited to, the specific examples that are described below and shown in the drawings.

General Overview

Software-based technologies for improving structured data collection, presentation, validation, and workflow management processes are disclosed, including the use of interpretable configuration files to define data objects, generate object-level and sub-object-level specifications for a forms-based interface, validation processes and a workflow-based interface. A back-end integration component maps the data objects, validation and workflow processes, and interface specifications to portions of a back-end database system. In one embodiment, a data processing system comprises one or more processors; one or more storage media storing instructions which, when executed by the one or more processors, cause the one or more processors to perform operations comprising causing a first computing device to interpret a configuration file; in response to the first computing device interpreting the configuration file, causing a display device to generate a forms-based interface comprising a data input control element arranged to obtain data in association with a data object that is defined in the configuration file; in response to detecting receipt of a data item by the data input control element of the forms-based interface, executing a data validation process that is, in the configuration file, associated with the data item; in response to validation of the data item by the data validation process, causing, by a second computing device, mapping the data item to a back-end data object; causing, by the second computing device or a third computing device, altering a validation process associated with the back-end data object based on a result of the executing of the validation process associated with the data item in the configuration file; causing storing the data item in a database system in association with the back-end data object.

System Overview

FIG. 1 is a block diagram that depicts an example computing system. In the example of FIG. 1, a computing system 100 is arranged to enable data-related communications between front-end software 130 and database system 140 in coordination with integration service 160 over an electronic communications network 120, where the front-end software 130 may be created and modified using software framework 150. Computing system 100 includes computing device(s) 110, computing devices 170, 172, and display devices 180, 182, which are communicatively coupled to the network 120.

Implemented in the devices 110, 170, 172, 180, 182 using computer software, hardware, or software and hardware, are processor-executable instructions, data structures, and digital data, stored in memory, which cooperate to provide the computer-implemented functionality described herein. Although these computer-implemented components each include discrete sets of computer programming instructions, data, and data structures, for ease of discussion, these components are represented schematically in FIG. 1 as front-end software 130, which includes forms-based interface 132, workflow-based interface 134, and front-end configuration 136; database system 140, which includes a database 142, a database management system 144, and a back-end configuration 146; software framework 150, which includes forms library 152 and validation modules 154; integration service 160, which includes object mapper 162 and workflow translator 164. When executed by a processor, the instructions cause computing devices 110, 170, 172, 180, 182 to operate in a particular manner as described herein.

System as used herein may refer to a single computer or network of computers and/or other devices. Computing device as used herein may refer to a computer or any other electronic device that is equipped with a processor. Although computing system 100 may be implemented with any number of individual instances of front-end software 130, forms-based interface 132, workflow-based interface 134, front-end configuration 136, database system 140, database 142, database management system 144, back-end configuration 146, software framework 150, forms library 152, validation modules 154, integration service 160, object mapper 162, workflow translator 164, computing devices 110, 170, 172, 180, 182, respectively, in this disclosure, these components may be referred to in the singular form for ease of discussion.

Front-end software 130, database system 140, software framework 150, integration service 160 are shown as separate elements in FIG. 1 for ease of discussion but the illustration is not meant to imply that separation of these elements is required in all embodiments. The illustrated systems (or their functionality) may be divided over any number of physical systems, including a single physical computer system, and can communicate with each other in any appropriate manner.

In some embodiments, each of computing devices 170, 172 is a client-side computing device or set of cooperating computing devices, such as a desktop computer, laptop machine, smart phone, tablet computer, or combination of any of such devices, and computing device(s) 110 are server-side computing device(s) such as a server computer or network of server computers accessible by network 120. As illustrated in FIG. 1, each of display devices 180, 182 is implemented in a computing device 170, 172, respectively, but may be implemented as a separate device or as part of another device, or as multiple networked display devices, in other implementations.

Network 120 may be implemented on any medium or mechanism that provides for the exchange of data between the devices that are connected to the network. Examples of network 120 include, without limitation, a network such as a Local Area Network (LAN), Wide Area Network (WAN), Ethernet or the Internet, or one or more terrestrial, satellite or wireless links. Network 120 may include a combination of networks, such as a combination of wired, optical and/or wireless networks, as needed to enable communications between the devices that are connected to the network.

Front-end software 130 is a software application that allows users of computing device 170 to interact with database system 140 through communications with database management system 144. The illustrative front-end software 130 includes forms-based interface 132, workflow-based interface 134, and front-end configuration 136. Forms-based interface includes a set of data input forms, each of which includes an arrangement of graphical user interface (GUI) elements such as data input control elements and other interactive control elements, which are configured to receive data, such as data items supplied by an input device of computing device 170.

Workflow-based interface 134 includes a set of GUI elements illustratively arranged in an inbox-style format, where an inbox includes a set of data objects, such as documents or multimedia data objects, that each have a set of associated tasks (where the set of tasks may be referred to as a workflow). Workflow-based interface 134 is programmed to track the execution of the tasks in the workflow associated with each document in each inbox, as well as state transitions associated with the completion of particular tasks.

Figure 2:
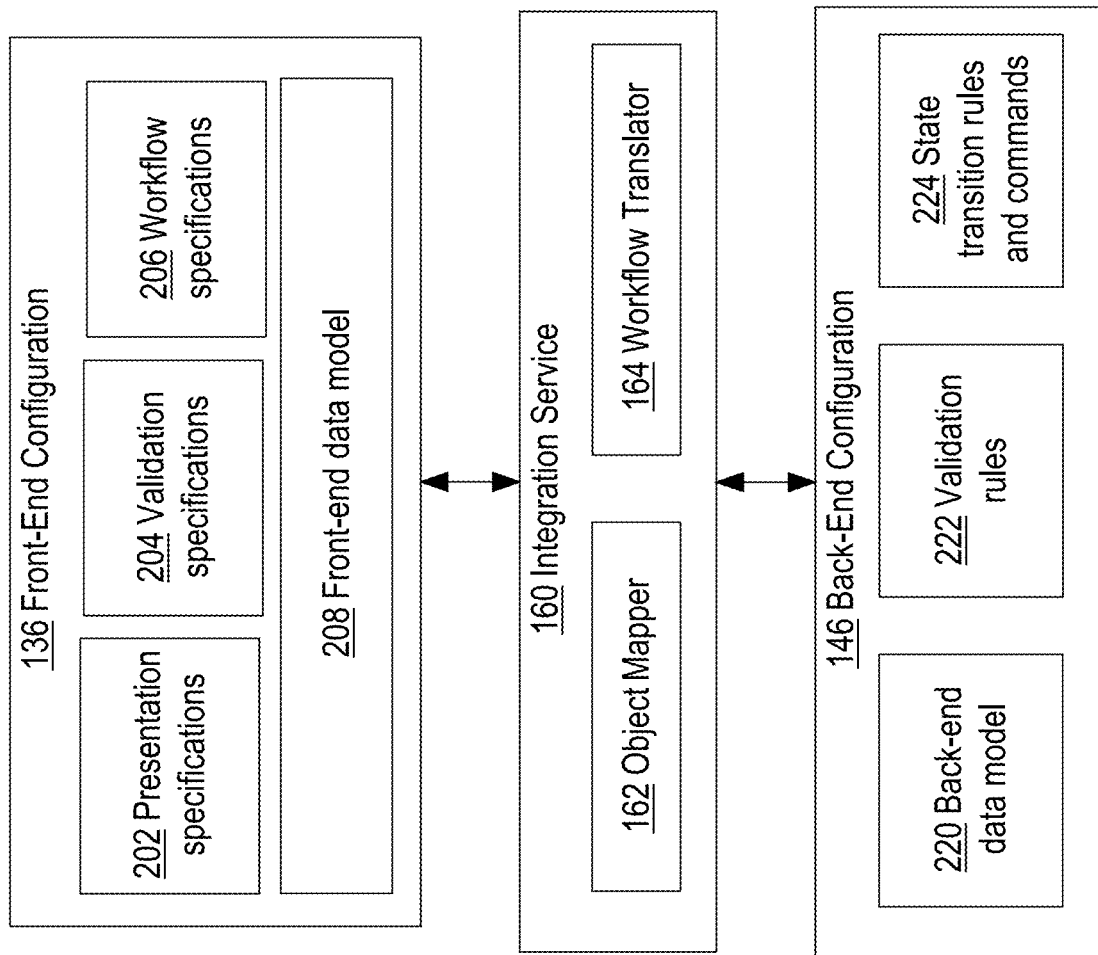
FIG. 2 is a block diagram that depicts an example of interactions between components of the system of FIG. 1.

Front-end configuration 136 includes, for example, one or more computer-interpretable configuration files and/or Java code, which drive the operation of forms-based interface 132 and workflow-based interface 134. Front-end configuration 136 utilizes or references portions of software framework 150 to generate forms-based interface 132 and workflow-based interface 134. Additional details of front-end configuration 136 are shown in FIG. 2, described below.

Database system 140 includes a database 142. Database 142 may store data using, for example, table- or object-based data structures. For example, database 142 may be implemented using a relational, graph-based, or object-based database technology. A database management system (DBMS) 144, 156 is a software system that includes application programming interfaces (APIs) and other tools that can be used by or cooperate with other software applications to create, store, view, manipulate data in the database. An example of a DBMS that may be used by database 142 is a commercially available DBMS, such as a DBMS provided by Oracle Corporation of Redwood Shores, Calif. or Microsoft Corporation of Redmond, Wash.

Database system 140 also stores a back-end configuration 146 which includes a data model that represents the database schema used by database 142 as well as data validation processes. As such, back-end configuration 146 includes conceptual abstractions of the underlying physical structure and organization of database 142 and the data stored in database 142. An ontology is an example of a form of object-based data model that may be used to implement back-end configuration 146. Ontologies can be created using commercially available software. An example of ontology software that may be used to create back-end configuration 146 is described in U.S. Pat. No. 7,962,495, titled "Creating Data in a Data Store Using a Dynamic Ontology."

In heterogenous database systems, one or more aspects of the back-end configurations used by the database systems are different. For instance, the models may use different labels to identify particular data objects, links, or properties. As another example, one of the models may define a data object for a type of data whereas the other model may define the same category of data as a property of a data object rather than as a data object. As yet another example, different models may specify different types of links between data objects. For instance, models may utilize different labels to describe analogous relationships between data objects.

Software framework 150 includes software development tools such as forms library 152 and validation modules 154, which can be used by a software developer using computing device 172 to create or modify front-end software 130. Forms library 152 includes a set of pre-defined form specifications, where each pre-defined form specification includes an arrangement of GUI elements such as text, date, and integer input boxes and pick lists associated with different data types. Validation modules 154 includes a set of pre-defined data validation routines, which include data validation rules for text, date, and integer data. Examples of validation modules 154 include logic that determines whether an item of input data or a set of input data items individually or collectively matches an expected data type, integer range or value, date range or value, text string value or length.

Integration service 160 is interposed between and facilitates data-related communications between front-end software 130 and database system 140. Integration service 160 includes an object mapper 162 and a workflow translator 164. Object mapper 162 maps, adapts, or translates data objects, properties, relationships, and associated data validation rules that are specified in front-end configuration 136 to appropriate portions of back-end configuration 146. Workflow translator 164 translates workflow-related events and state transitions specified in front-end configuration 136 to appropriate commands that can be recognized and executed by database system 140. Portions of integration service 160 can be implemented using a combination of a markup language and Java code and/or JavaScript Object Notation (JSON) files.

FIG. 2 is a block diagram that illustrates details of front-end configuration 136, back-end configuration 146, and operation of integration service 160. The illustrative front-end configuration 136 includes presentation specifications 202, validation specifications 204, workflow specifications 206, and front-end data model 208. Front-end data model 208 specifies (or declares) data objects, properties (or attributes) of data objects, relationships between data objects (links), and validation rules associated with portions of data objects and properties. Portions of front-end data model 208 are used in or referenced by presentation specifications 202, validation specifications 204 and workflow specifications 206. Front-end data model 208 may include mappings of data objects, properties, relationships, and/or validation rules to portions of back-end configuration 146 or those mappings may be defined in object mapper 162.

Presentation specifications 202 include rules and/or definitions that are used to generate and operate portions of forms-based interface 132 and/or workflow-based interface 134. For example, associations of GUI elements to data objects or properties may be contained in presentation specifications 202. Validation specifications 204 include rules, definitions, and/or references to validation modules 154 that are used to perform data validation processes on data items input into forms-based interface 132. For example, associations of validation modules 154 to data objects, properties, or relationships and/or valid entries for pick lists may be contained in validation specifications 204. Workflow specifications 206 includes rules and/or definitions that are used to generate and operate portions of workflow-based interface 134. For example, workflow specifications 206 may include rules and/or definitions that define workflow states and associate particular sets of workflow states with particular data objects, properties, or types of data objects.

In some embodiments, front-end data model 208, presentation specifications 202, validation specifications 204, and workflow specifications 206 may be implemented in one or more configuration files and/or Java code. For example, portions specifications 202, 204, 206 and model 208 that are used to generate and operate forms-based interface 132 may be contained in one configuration file while portions of specifications 202, 204, 206 and model 208 that are used to generate and operate workflow-based interface 134 are contained in a different configuration file or a combination of a configuration file and Java code. Table 1 below is a simplified example of a portion of front-end configuration 136 that may used to generate and operate forms-based interface 132.

TABLE 1

Example of Front-End Configuration Specifications for Forms-Based Interface.

| Metadata | Data/reference |
| --- | --- |
| DataSource | ProductsDB |
| Namespace | Objects |
| Name | Organizational Information |
| Fieldname | Name |
| Fieldtype | Text |
| URI | Com.property.organizationname |
| SubpropertyType | Role |
| Validators | Required |
| Fieldname | Date |
| Type | DatePicker |
| URI | Com.property.incorporationdate |
| Fieldname | Locations |
| Type | List |

It can be seen from Table 1 that front-end configuration 136 defines a set of data objects (fields) and properties, assigns data types to the objects and properties, specifies validation rules (by referencing "Validators"), types of GUI control elements (Date Picker, List, Text) and labels to be displayed in forms-based interface 132, and maps objects and properties to portions of back-end configuration 146 (via URI references). In operation, computing device 170 reads the forms-based portions of front-end configuration 136 and renders forms-based interface 132 on display device 180.

Table 2 below is a simplified example of a portion of front-end configuration 136 that may be used to generate and operate workflow-based interface 134.

TABLE 2

Example of Front-End Configuration Specifications for Workflow-Based Interface.

| Metadata | Data/reference/instruction |
| --- | --- |
| Placeholder | "Search people . . . " |
| templateID | People_search |
| Inboxes: | |
| Inboxtype | DB_ref1 |
| Title | "All People" |
| Icon | "people" |
| showActions: | True |
| URI searchRequest: | Com.property.name |
| Size | 20 |
| Query | "types" |
| Inboxtype | DB_ref2 |

TABLE 2-continued

Example of Front-End Configuration Specifications for Workflow-Based Interface.

| Metadata | Data/reference/instruction |
| --- | --- |
| Title | "Documents Pending Approval" |
| Icon | "document" |
| showActions searchRequest: | True |
| Datasource | "workflow" |
| Size | 20 |
| Query: | |
| Type | "exact" |
| Field | "currentState" |
| Values: | "PENDING APPROVAL" |

The example of Table 2 includes configuration specifications for two portions of workflow-based interface 134, namely, two inboxes titled "All People" and "Documents Pending Approval." The "All People" inbox is accessible by an interactive graphical control element ("icon") and is created by generating a query "types" which executes a search on database "DB_ref1." The "Documents Pending Approval" is defined as a workflow (Datasource="workflow"), and thus includes a field that tracks "currentState." In operation, computing device 170 reads the workflow-based portions of front-end configuration 136 and renders workflow-based interface 134 on display device 180.

It should be noted that front-end configuration 136 can be specified independently of the particular back-end database system 140 that will be used to store data collected and validated in front-end software 130. To that end, front-end configuration 136 can define data objects, validation rules, and the like differently than or in addition to those contained in back-end configuration 146. For example, front-end configuration 136 can associate a different data type with a particular data object than the data type that is defined for that data object in the back-end configuration 146, or front-end configuration 136 can specify different (stricter or more lenient, more detailed or less detailed, more granular or less granular) validation rules than the validation rules that are defined for the data object in back-end configuration 146. For instance, whereas back-end configuration 146 may specify a particular property of a data object as having a data type of "string" (such that any alphanumeric value can be input for that property), front-end configuration 36 may constrain the valid inputs for that property to a specific set of string values in a picklist, without needing to inform the back-end system of its more specific validation rule.

Back-end configuration 146 includes back-end data model 220, validation rules 222, and state transition rules and commands 224. The specific details of back-end configuration 146 will be dependent on the particular database system 140 that is selected.

In operation, integration service 160 operates object mapper 162 and workflow translator 164 to facilitate data-related communications between front-end software 130 and database system 140. For example, object mapper 162 maps aspects of front-end data model 208 to appropriate portions of back-end data model 220 and maps portions of validation specifications 204 to appropriate portions of validation rules 222. In doing so, object mapper 162 may specify rules for conflict resolution in the event that there is a conflict between front-end configuration 136 and back-end configuration 146. For example, if validation specifications 204 define a validation rule for a data object that is more lenient than a validation rule applied to that data object on the back end by validation rules 222, object mapper 162 may include a rule that in the event of such a conflict, the front-end validation specifications 204 override or modify the back-end validation rules 222.

Workflow translator 164 converts workflow specifications 206 to corresponding state transition rules and commands 224, which can be executed by database system 140. Workflow translator 164 may similarly include conflict resolution processes in the event of a conflict or difference between, for example, state transitions defined in the front-end workflow specifications 206 and back-end state transitions specified in state transition rules and commands 224.

Process Overview

Figure 3:
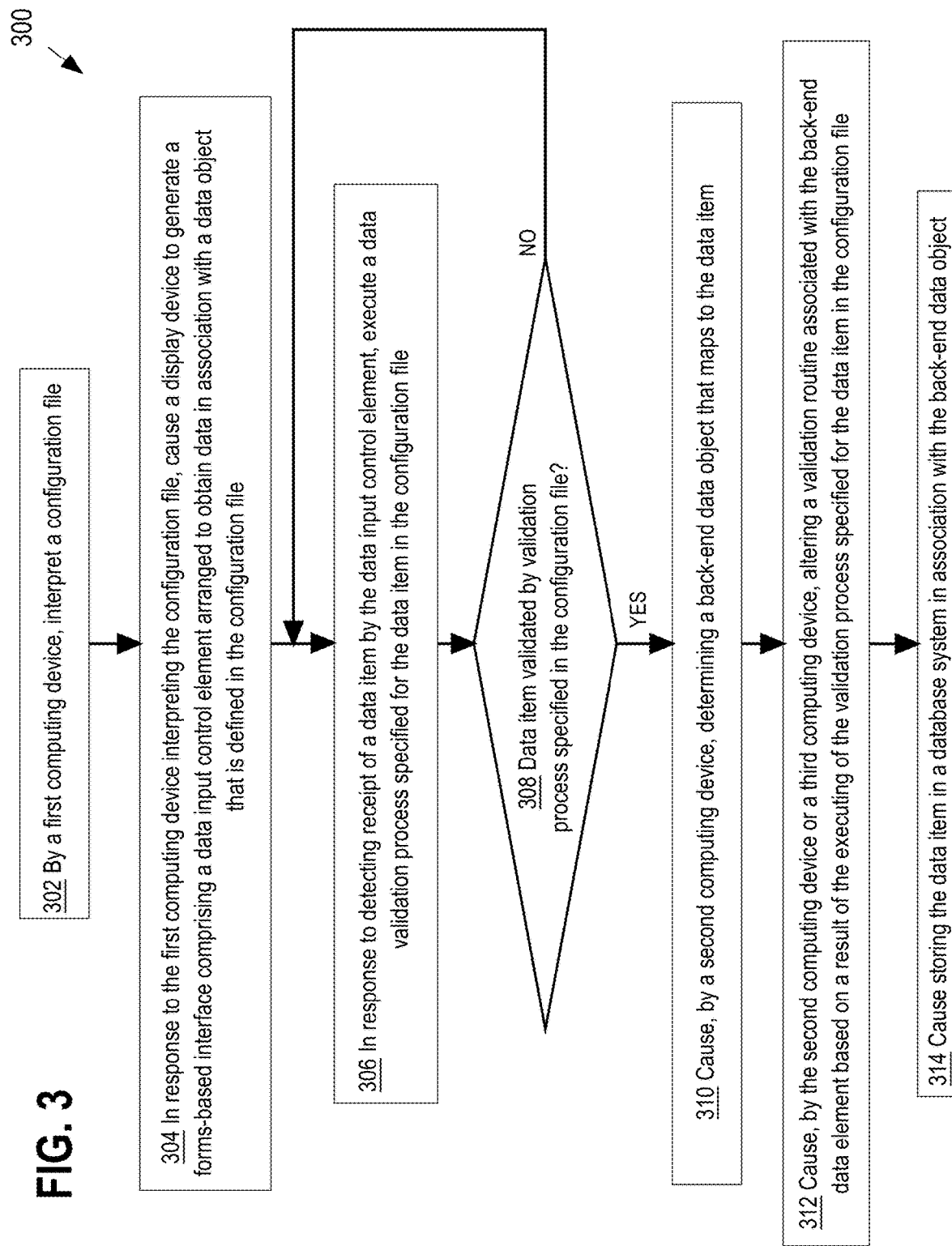
FIG. 3 is a flow diagram that depicts a process that may be executed by the system of FIG. 1.
Figure 4:
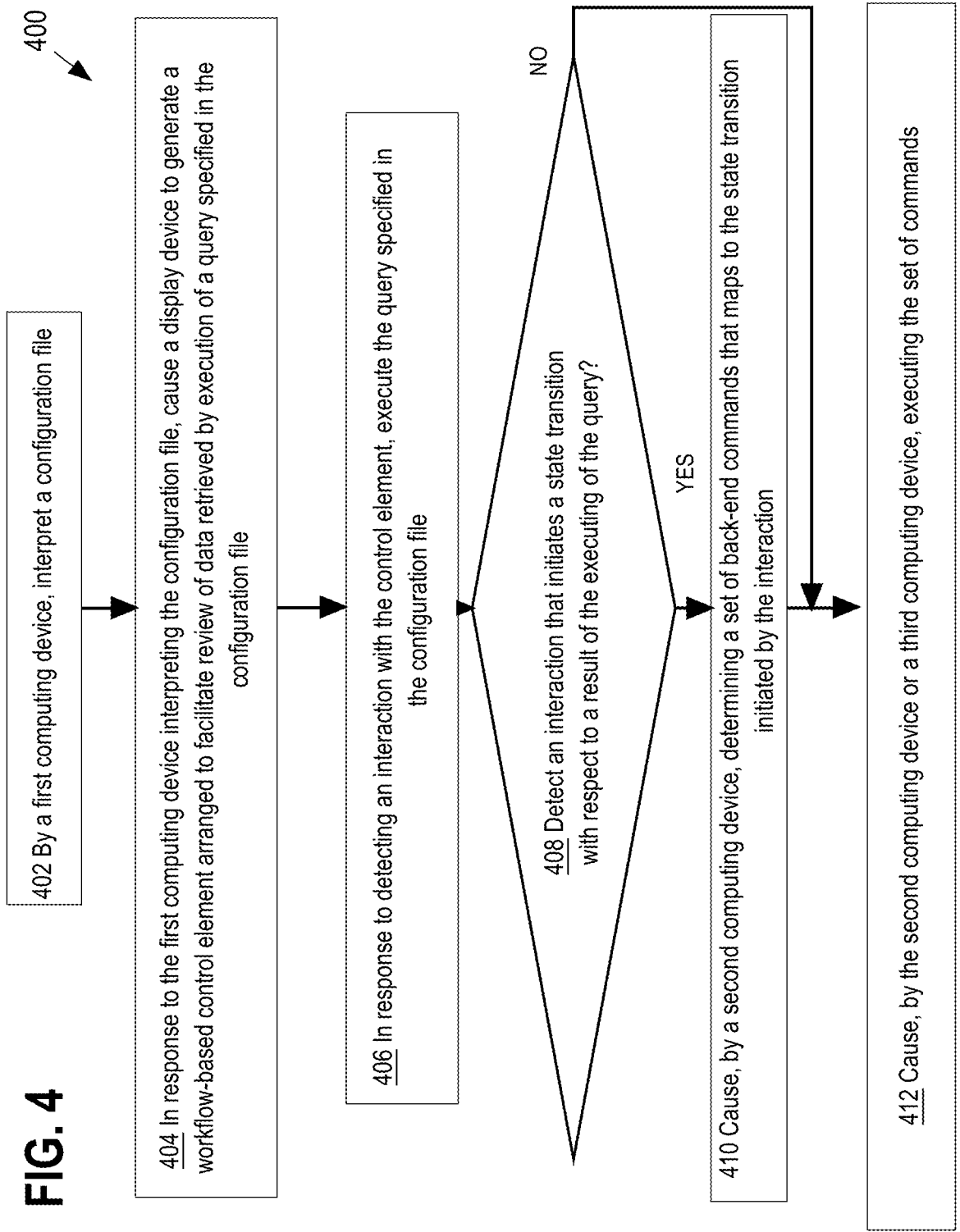
FIG. 4 is a flow diagram that depicts another process that may be executed by the system of FIG. 1.

FIG. 3 and FIG. 4 illustrate processes that can be performed by computing system 100. FIG. 3 is a flow diagram that depicts a process 300 for operating a forms-based interface of a front-end software application and coordinating a data validation process of the forms-based interface with a validation process of a back-end database system. Portions of process 300 may be performed by a single entity or program or by multiple entities or programs, including a client device sending communications to one or more server computers and/or a server computer receiving communications from one or more client devices. The operations of the process as shown in FIG. 3 can be implemented by one or more processors executing instructions that are stored in computer memory. For purposes of providing a clear example, the operations of FIG. 3 are described as performed by computing device(s) 110, 170, 180, which may be individually or collectively referred to as simply "computing system 100."

In operation 302, computing system 100 interprets a front-end configuration file. To do this, computing system 100 causes a computing device, such as computing device 170, to read a file that contains a front-end configuration 136 and may traverse a reference in the configuration file to a forms library, in order to determine a particular forms-based interface to generate.

In operation 304, computing system 100 causes a display device, such as display device 180, to render a forms-based interface that includes a data input control element (such as a text box, pick list, or date field), which is arranged to obtain data, such as property of a data object, in association with a data object that is defined in the configuration file. For example, the forms-based interface may include a text field to receive a description of the organization or a date field to receive a date of incorporation.

In operation 306, computing system 100 detects receipt of a data item by the data input control element of the forms-based interface that has been rendered in operation 304. When the data item is detected, computing system 100 executes a data validation process that is, in the configuration file, associated with the data object. The data validation process may include a binary or a non-binary evaluation of the data item against an expected value, set, range, or list of values, or pattern, where "binary" refers to a type of validation process that does not allow the system to accept the data item and proceed to the next operation unless the validation test is successfully passed, and a non-binary validation process may allow the system to accept the data item, for example after display of a warning message and an opportunity to modify the data item.

In one example, the configuration file specifies a data validation process that includes comparing the data item to a set of data items that have been received previously by the data input control element, mathematically determining a measure of similarity or dissimilarity between the data item and the set of previously received data items, and validating the data item based on the measure of similarity. For instance, a mean or average value of the historical set of data values may be computed, and then the current data item compared to the mean or average value by computing a standard deviation. Based on the standard deviation, the computing system may determine that the validation test is passed or not passed.

In another example, the data validation process that is, in the configuration file, associated with the data item includes comparing the data item to context data associated with the receipt of the data item, and based on the comparing, validating the data item. For instance, location data in the data item may be compared to a current geographic location of computing device 170 as determined by, for example, a sensor system of computing device 170.

In operation 308, computing system 100 determines whether the data item received in operation 306 successfully passed the validation test executed by the validation process of operation 306. If the validation test was not successfully passed, computing system 100 may return to operation 306 or simply end the process 300. If the validation test was successfully passed, computing system 100 proceeds to operation 310.

In operation 310, computing system 100 causes mapping of the data item received in operation 304 to a back-end data object. To do this, computing system 100 may utilize object mapper 162 of integration service 160 or portions of front-end data model 208, depending on the particular implementation. In an example, object mapper 162 may traverse a mapping between a graph-based data model used by back-end database system 140 and a non-graph-based data model used by front-end software 130 and specified in the front-end configuration file. Computing system 100 determines how and where to store the data item in database 142. The mapping process of operation 310 may be performed by a different computing device than the computing device that performs operation 302, in some implementations.

In operation 312, computing system 100 alters a validation process that is, in the back-end configuration 146, associated with the back-end data object, based on a result of the executing of the validation process that is, in the configuration file, associated with the data object. Operation 312 can be performed by computing system 100 when there is a conflict or difference between the validation process specified in the front-end configuration file and the validation process specified in the back-end configuration. For example, operation 312 may skip, modify, or override a back-end data validation process if the front-end validation process is more stringent and has been successfully passed, or if the front-end validation process is more lenient and has been successfully passed. In another example, the validation process associated with the back-end data object may be modified to accept a different data type.

In operation 314, computing system 100 stores the data item in database 142 in association with the back-end data object, for example, in an attribute field associated with the back-end data object. Operation 312 and operation 314 can be performed by different computing devices than the computing device(s) that perform other portions of the process 300.

FIG. 4 is a flow diagram that depicts a process 400 for operating a workflow-based interface of a front-end software application and coordinating a state transition process of the workflow-based interface with a state transition process executable by a back-end database system. Portions of process 400 may be performed by a single entity or program or by multiple entities or programs, including a client device sending communications to one or more server computers and/or a server computer receiving communications from one or more client devices. The operations of the process as shown in FIG. 4 can be implemented by one or more processors executing instructions that are stored in computer memory. For purposes of providing a clear example, the operations of FIG. 4 are described as performed by computing device(s) 110, 170, 172, which may be individually or collectively referred to as simply "computing system 100."

In operation 402, computing system 100 interprets a front-end configuration file. To do this, computing system 100 causes a computing device, such as computing device 170, to read a file that contains, for example, a front-end configuration 136, and may traverse a reference in the configuration file to a set of workflow transition rules, which may be coded in, for example, a Java programming language.

In operation 404, computing system 100 causes a display device, such as display device 180, to render a workflow-based interface that includes a workflow-based interactive control element (such as an interactive icon), which is arranged to facilitate review of data retrieved by execution of a query that is specified in the configuration file. For example, the workflow-based interface may include set of inboxes that are each represented in the workflow-based interface by a different interactive icon. Selection of an interactive icon can be an interaction that causes computing system 100 to execute a predefined query to retrieve data objects, such as documents or multi-media data objects, and to display a list of the retrieved data items.

In operation 406, computing system 100 detects an interaction with the interactive control element of the workflow-based interface that has been rendered in operation 404. For example, computing system detects selection of an interactive icon. When the interaction is detected, computing system 100 executes a search query that is, in the configuration file, associated with the icon or is associated with the interaction with the icon.

One type of query that may be executed in operation 406 is a query that retrieves all data objects that are of a same object type or have a matching property (such as, all "people" objects, or all "event" objects having a same date of occurrence or a same location). Another type of query that may be executed in operation 406 is a query that retrieves data objects that match a particular workflow state (such as, all documents that are pending approval) or have a matching property of a particular workflow state (such as, all documents that have been drafted by Person A).

It should be noted that any data object specified in the front-end configuration can be associated with any number of different inboxes. Thus, the same data object may appear in search results generated by multiple different inboxes. However, the actions that can be taken with respect to that particular data object may be different, depending on the inbox, because the actions may be associated with the inbox and not directly with the data object. For example, an inbox that lists all "person" data objects may not have workflow state information associated with it. Therefore, the "approve" action may not be available for items in the "person" inbox but may be available for items in a "pending approval" inbox, which may have workflow state information associated with it. These and other specifications for the contents of and available actions that are to be associated with various inboxes are defined in the computer-interpretable front-end configuration file.

Each list of search results is, as noted above, organized in the workflow-based interface under an inbox name or icon, and any item in any inbox may have associated with it a set of actions that can be performed by interaction with the workflow-based interface. For example, a hover-over GUI action on the name of a particular inbox or data object displayed in the inbox may reveal a list of available actions, which may include, for instance, an option to enter an "edit" mode, which causes the properties of the data object to be displayed in the forms-based interface for review and editing, or to add new data to the object, as needed.

Another option that may be revealed by a hover-over GUI action on an inbox or a data object listed in an inbox may be to review a "home page" of all information associated with the data object, including links to other data objects. In the "home page" view, the links can be traversed to view and/or edit the linked data objects. The links between the data objects that are presented in the front-end software are defined in the front-end configuration file (for example, as part of the front-end data model), and may or may not correspond to links that are defined in the back-end data model. For instance, the front-end data model may be a simplified or "flatter" data model and the back-end data model may be a more complex or "graphical" data model.

Execution of any of the actions that are available with respect to an inbox or a data object listed in an inbox can initiate a state transition. For example, another option that may be revealed by a hover-over GUI action on an inbox or a data object listed in an inbox may be to "approve" a data object for uploading to a back-end database system. Detection of the "approve" action can initiate a state transition that causes data communication with the back-end database system. Another example of a state transition is changing the workflow state that is associated with a data object from "draft" to "pending approval." In this example, the state transition may not be communicated to the back-end database system because the next workflow state involves further review of the data object.

In operation 408, computing system 100 determines whether an interaction is detected that initiates a state transition with respect to a search result. For example, in operation 408, computing system 100 may detect a hover-over action associated with a data object listed in a particular inbox that has workflow state information associated with it, and if the hover-over action selects "approve" as the next action, a state transition may be initiated. If no state transition-initiating action is detected in operation 408, computing system 100 may proceed to operation 412 or simply end the process 400. If the state transition-initiating action is detected, computing system 100 proceeds to operation 410.

In operation 410, computing system 100 determines a set of back-end commands that map to the workflow state transition initiated by the interaction detected in operation 408. To do this, the workflow-based interface 134 may cooperate with workflow translator 164 of integration service 160. In doing so, computing system 100 may determine that no back-end commands need to be executed in response to the workflow state transition, as mentioned above. However, if workflow translator determines a set of back-end commands to execute in response to the state transition detected in operation 408, then in operation 412, computing system 100 executes the set of back-end commands on the database system 140.

Implementation Example—Hardware Overview

According to one embodiment, the techniques described herein are implemented by one or more computing devices. For example, portions of the disclosed technologies may be at least temporarily implemented on a network including a combination of one or more server computers and/or other computing devices. The computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such computing devices may also combine custom hard-wired logic, ASICs, or FPGAs with custom programming to accomplish the described techniques.

The computing devices may be server computers, personal computers, or a network of server computers and/or personal computers. Illustrative examples of computers are desktop computer systems, portable computer systems, handheld devices, mobile computing devices, wearable devices, body mounted or implantable devices, smart phones, smart appliances, networking devices, autonomous or semi-autonomous devices such as robots or unmanned ground or aerial vehicles, or any other electronic device that incorporates hard-wired and/or program logic to implement the described techniques.

Figure 5:
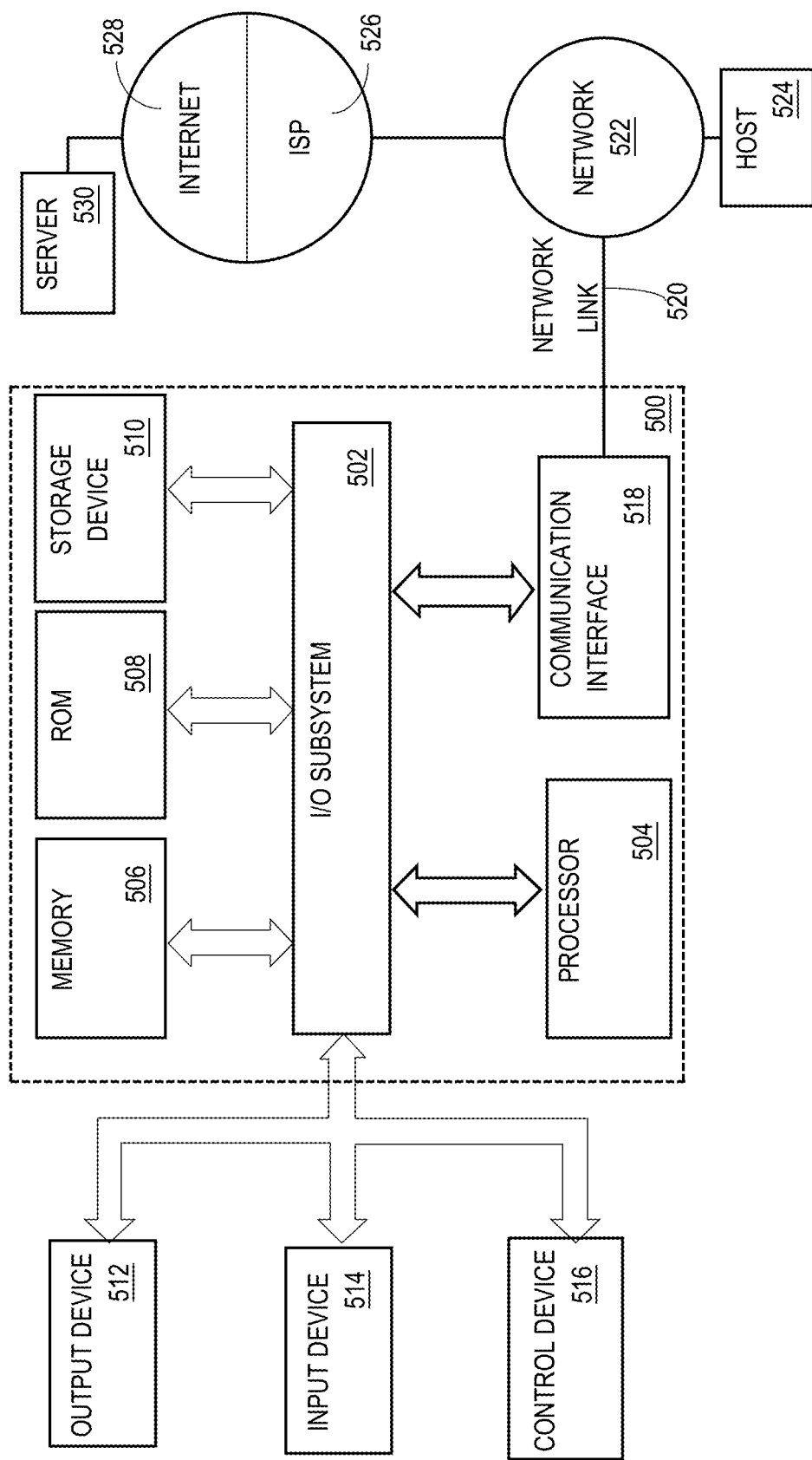
FIG. 5 is a block diagram that illustrates a computer system upon which an embodiment of the disclosed technologies may be implemented.

For example, FIG. 5 is a block diagram that illustrates a computer system 500 upon which an embodiment of the present invention may be implemented. Components of the computer system 500, including instructions for implementing the disclosed technologies in hardware, software, or a combination of hardware and software, are represented schematically in the drawings, for example as boxes and circles.

Computer system 500 includes an input/output (I/O) subsystem 502 which may include a bus and/or other communication mechanism(s) for communicating information and/or instructions between the components of the computer system 500 over electronic signal paths. The I/O subsystem may include an I/O controller, a memory controller and one or more I/O ports. The electronic signal paths are represented schematically in the drawings, for example as lines, unidirectional arrows, or bidirectional arrows.

One or more hardware processors 504 are coupled with I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor.

Computer system 500 also includes a memory 506 such as a main memory, which is coupled to I/O subsystem 502 for storing information and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, render computer system 500 into a special-purpose machine that is customized to perform the operations specified in the instructions.

Computer system 500 further includes a non-volatile memory such as read only memory (ROM) 508 or other static storage device coupled to I/O subsystem 502 for storing static information and instructions for processor 504. The ROM 508 may include various forms of programmable ROM (PROM) such as erasable PROM (EPROM) or electrically erasable PROM (EEPROM). A persistent storage device 510 may include various forms of non-volatile RAM (NVRAM), such as flash memory, or solid-state storage, magnetic disk or optical disk, and may be coupled to I/O subsystem 502 for storing information and instructions.

Computer system 500 may be coupled via I/O subsystem 502 to one or more output devices 512 such as a display device. Display 512 may be embodied as, for example, a touch screen display or a light-emitting diode (LED) display or a liquid crystal display (LCD) for displaying information, such as to a computer user. Computer system 500 may include other type(s) of output devices, such as speakers, LED indicators and haptic devices, alternatively or in addition to a display device.

One or more input devices 514 is coupled to I/O subsystem 502 for communicating signals, information and command selections to processor 504. Types of input devices 514 include touch screens, microphones, still and video digital cameras, alphanumeric and other keys, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be implemented as a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

Computer system 500 may implement the techniques described herein using customized hard-wired logic, one or more ASICs or FPGAs, firmware and/or program logic which in combination with the computer system causes or programs computer system 500 to operate as a special-purpose machine. According to one embodiment, the techniques herein are performed by computer system 500 in response to processor 504 executing one or more sequences of one or more instructions contained in memory 506. Such instructions may be read into memory 506 from another storage medium, such as storage device 510. Execution of the sequences of instructions contained in memory 506 causes processor 504 to perform the process steps described herein. In alternative embodiments, hard-wired circuitry may be used in place of or in combination with software instructions.

The term "storage media" as used in this disclosure refers to any non-transitory media that store data and/or instructions that cause a machine to operation in a specific fashion.

Such storage media may comprise non-volatile media and/or volatile media. Non-volatile media includes, for example, optical or magnetic disks, such as storage device 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage device 510 either before or after execution by processor 504.

Computer system 500 also includes a communication interface 518 coupled to bus 502. Communication interface 518 provides a two-way data communication coupling to network link(s) 520 that are directly or indirectly connected to one or more communication networks, such as a local network 522 or a public or private cloud on the Internet. For example, communication interface 518 may be an integrated-services digital network (ISDN) card, cable modem, satellite modem, or a modem to provide a data communication connection to a corresponding type of communications line, for example a coaxial cable or a fiber-optic line or a telephone line. As another example, communication interface 518 may include a local area network (LAN) card to provide a data communication connection to a compatible LAN. Wireless links may also be implemented. In any such implementation, communication interface 518 sends and receives electrical, electromagnetic or optical signals over signal paths that carry digital data streams representing various types of information.

Network link 520 typically provides electrical, electromagnetic, or optical data communication directly or through one or more networks to other data devices, using, for example, cellular, Wi-Fi, or BLUETOOTH technology. For example, network link 520 may provide a connection through a local network 522 to a host computer 524 or to other computing devices, such as personal computing devices or Internet of Things (IoT) devices and/or data equipment operated by an Internet Service Provider (ISP) 526. ISP 526 provides data communication services through the world-wide packet data communication network commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

Implementation Example—Basic Software System

Figure 6:
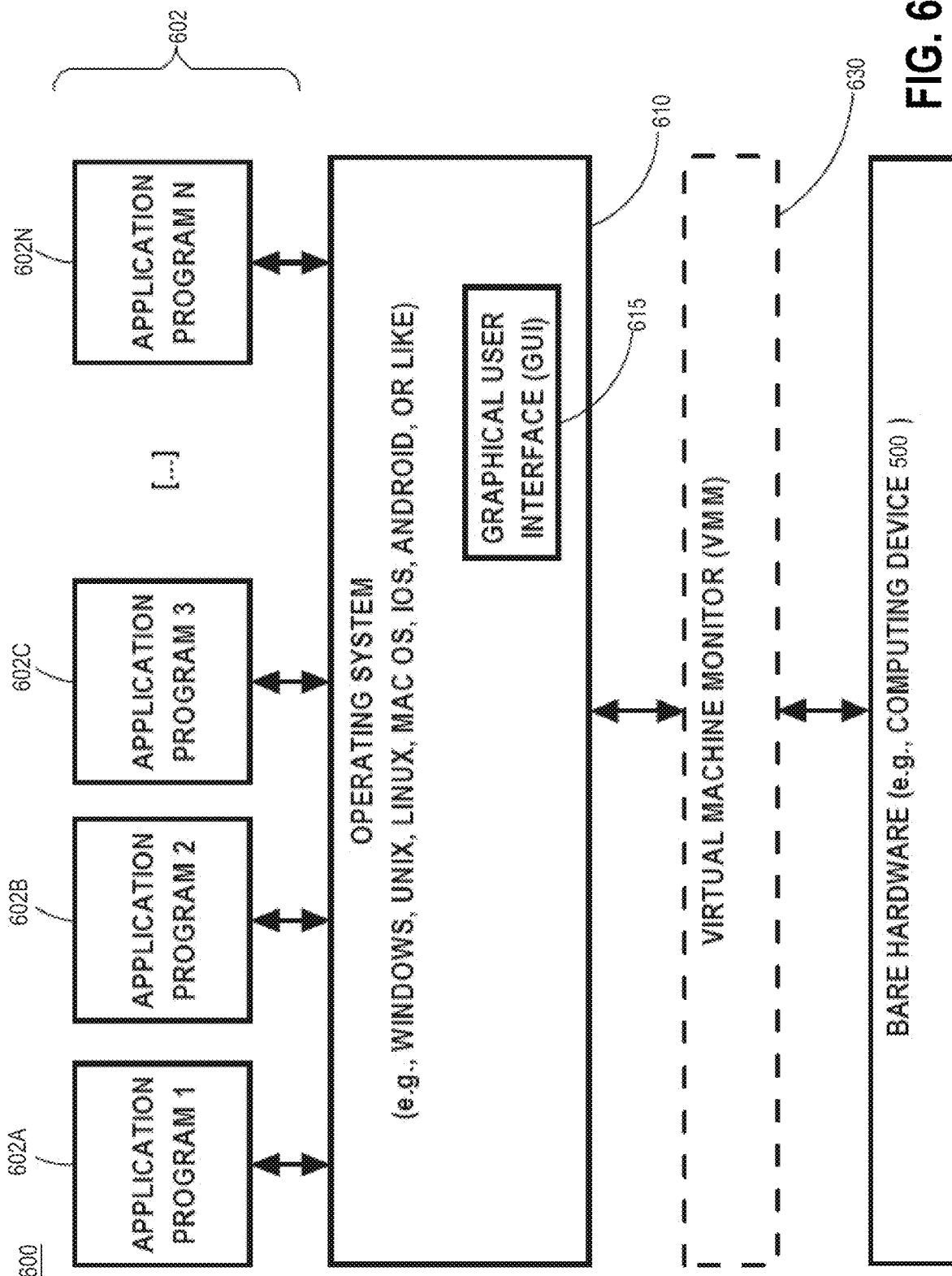
FIG. 6 is a block diagram of a basic software system that may be employed for controlling the operation of a computing device.

FIG. 6 is a block diagram of a basic software system 600 that may be employed for controlling the operation of computing device 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of a computing device, such as device 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506 for execution by the system 600. The applications or other software intended for use on device 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on bare hardware 620 (e.g., processor(s) 504) of device 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the device 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on bare hardware of device 500 directly. In these instances, the same version of the guest operating system configured to execute on the bare hardware of device 500 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

General Considerations

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used in this disclosure the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," etc., indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to effect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

In the foregoing specification, embodiments of the disclosed technologies have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for coordinating a state transition process of an interface with a state transition process of a database system, the method comprising:
   interpreting a configuration file that specifies a query;
   causing the interface to display a control element based on the interpretation of the configuration file;
   executing the query in response to detecting an interaction with the control element;
   detecting a state transition with respect to a result of executing the query;
   mapping the state transition to a set of commands;
   executing the set of commands on the database system;
   wherein the method is performed by one or more computing devices.

2. The method of claim 1, further comprising traversing a reference in the configuration file to a set of workflow transition rules.

3. The method of claim 1, further comprising causing the interface to display, as the control element, a selectable icon.

4. The method of claim 1, further comprising retrieving a set of data objects in response to the interaction with the control element.

5. The method of claim 4, further comprising causing the interface to display, as the result, at least one data object of the set of data objects.

6. The method of claim 1, wherein the query is associated with the control element in the configuration file.

7. The method of claim 1, wherein the query is associated with the interaction in the configuration file.

8. The method of claim 1, wherein executing the query comprises retrieving a set of data objects that match a particular workflow state.

9. The method of claim 1, wherein executing the query comprises retrieving a set of data objects that match a property of a particular workflow state.

10. The method of claim 1, wherein the state transition comprises at least one of changing a workflow state associated with a data object and communicating a data object to a database system.

11. A system comprising:
one or more processors;
memory operably coupled to the one or more processors;
the one or more processors cooperating with the memory to perform operations comprising:
interpreting a configuration file that specifies a query;
causing an interface to display a control element based on the interpretation of the configuration file;
executing the query in response to detecting an interaction with the control element;
detecting a state transition with respect to a result of executing the query;
mapping the state transition to a set of commands;
executing the set of commands on a database system.

12. The system of claim 11, the operations further comprising traversing a reference in the configuration file to a set of workflow transition rules.

13. The system of claim 11, the operations further comprising causing the interface to display, as the control element, a selectable icon.

14. The system of claim 11, the operations further comprising retrieving a set of data objects in response to the interaction with the control element.

15. The system of claim 14, the operations further comprising causing the interface to display, as the result, at least one data object of the set of data objects.

16. The system of claim 11, wherein the query is associated with the control element in the configuration file.

17. The system of claim 11, wherein the query is associated with the interaction in the configuration file.

18. The system of claim 11, wherein executing the query comprises retrieving a set of data objects that match a particular workflow state.

19. The system of claim 11, wherein executing the query a set of data objects that match a property of a particular workflow state.

20. The system of claim 11, wherein the state transition comprises at least one of changing a workflow state associated with a data object and communicating a data object to the database system.

* * * * *